United States Patent
Jang et al.

(10) Patent No.: US 8,252,453 B2
(45) Date of Patent: Aug. 28, 2012

(54) SECONDARY BATTERY

(75) Inventors: Youngcheol Jang, Yongin-si (KR);
Nohyun Kwag, Yongin-si (KR);
Kyungwon Seo, Yongin-si (KR);
Jeongdeok Byun, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 180 days.

(21) Appl. No.: 12/076,112

(22) Filed: Mar. 13, 2008

(65) Prior Publication Data
US 2008/0226973 A1 Sep. 18, 2008

(30) Foreign Application Priority Data

Mar. 15, 2007 (KR) .................. 10-2007-0025350

(51) Int. Cl.
*H01M 2/02* (2006.01)
*H01M 2/20* (2006.01)
*H01M 2/30* (2006.01)
(52) U.S. Cl. ............. 429/163; 429/7; 429/175; 429/178
(58) Field of Classification Search .................. 429/7–8, 429/121, 163–187
See application file for complete search history.

(56) References Cited

U.S. PATENT DOCUMENTS

| 5,088,934 | A | * | 2/1992 | Chow et al. | 439/395 |
| 6,803,144 | B2 | * | 10/2004 | Hovi et al. | 429/123 |
| 7,474,076 | B2 | | 1/2009 | Kim | |
| 7,550,229 | B2 | | 6/2009 | Yoon | |
| 2004/0096732 | A1 | * | 5/2004 | Shin et al. | 429/61 |
| 2004/0126651 | A1 | * | 7/2004 | Kim et al. | 429/61 |
| 2004/0137314 | A1 | * | 7/2004 | Fukui | 429/62 |
| 2004/0146775 | A1 | * | 7/2004 | Yoshizawa et al. | 429/61 |
| 2005/0064286 | A1 | * | 3/2005 | Kozu et al. | 429/180 |
| 2006/0024573 | A1 | * | 2/2006 | Yim et al. | 429/174 |
| 2006/0093896 | A1 | * | 5/2006 | Hong et al. | 429/61 |
| 2006/0210870 | A1 | * | 9/2006 | Moon et al. | 429/175 |
| 2007/0264535 | A1 | * | 11/2007 | Lee et al. | 429/7 |
| 2008/0233472 | A1 | * | 9/2008 | Ota et al. | 429/122 |

FOREIGN PATENT DOCUMENTS

| KR | 10-2005-0074197 | | 7/2005 |
| KR | 10-2006-0046292 | | 5/2006 |
| WO | WO 2006/046343 | * | 5/2006 |

* cited by examiner

*Primary Examiner* — Basia Ridley
*Assistant Examiner* — Jacob Buchanan
(74) *Attorney, Agent, or Firm* — Robert E. Bushnell, Esq.

(57) ABSTRACT

A secondary battery that can simplify manufacturing of an assembly of a bare cell and a protection circuit module, and reduce manufacturing costs by installing a connecting member of a protection circuit module electrically coupled to a bare cell in one direction of the bare cell. The secondary battery may be constructed with a bare cell; a protection circuit module installed on one edge side surface of the bare cell; first and second electrode terminals included in the bare cell; and first and second lead plates respectively configured to electrically couple the protection circuit module to the first and second electrode terminals, wherein the first and second lead plates are installed on the same single side edge surface between side surfaces of the bare cell.

15 Claims, 5 Drawing Sheets

SECONDARY BATTERY

CLAIM OF PRIORITY

This application makes reference to, incorporates the same herein, and claims all benefits accruing under 35 U.S.C. §119 from an application for SECONDARY BATTERY earlier filed in the Korean Intellectual Property Office on 15 Mar. 2007 and there duly assigned Serial No. 10-2007-0025350.

BACKGROUND OF THE INVENTION

1. Field of the Invention

The present invention relates to a secondary battery, and more particularly, to a secondary battery that can simplify a manufacturing process for an assembly of a bare cell and a protection circuit module, and reduce manufacturing costs.

2. Description of the Related Art

Generally, as lightweight and high-function portable wireless devices, such as video cameras, cellular phones, portable computers, and others, have been developed, a lot of research on the secondary battery which are used as a driving power supply of the portable wireless device has been performed. For example, the secondary batteries include nickel-cadmium batteries, nickel-hydrogen batteries, a nickel-zinc battery and lithium secondary batteries, etc. Among them, the lithium secondary battery is widely used for an electronic appliance field because the lithium secondary battery can be recharged and the size can be miniaturized, and the lithium secondary battery has a high capacity, a high operating voltage and a high energy density per unit weight.

The lithium secondary battery is formed by mounting a safety device, such as a PTC (positive temperature coefficient) element, a thermal fuse and a protection circuit module, on an electrode assembly including a cathode, an anode and a separator. A can receives the electrode assembly and an electrolyte, and a bare cell seals an upper end opening of a can by a cap assembly, and is received in a separate packing case, or filled with hot melt resin, tubed and labeled by a thin packing material. The safety devices prevent fire or explosion by shutting down an electric current, when an interior temperature of the battery becomes too high by connecting a cathode terminal of the bare cell to an anode terminal by a lead plate of a conducting material, or when a voltage is increased by overcharge, or when some other operational characteristic of the battery deviates excessively from its normal range of operation.

A conventional battery pack may be constructed with a bare cell having an electrode terminal protruding toward one short side edge surface so as to be charged and discharged, a core pack including a protection circuit module combined with one side surface of the bare cell. A resin molded part may be formed so as to be installed on an outer set while the protection circuit module preventing from separating from the bare cell by a hot melt technique of filling hot-melt resin on an upper region of the core pack including the protection circuit module, and an outer cover covering both side parts of the core pack to form a part of the outer appearance.

Conventionally, when the core pack of the lithium secondary battery was manufactured, the lead plate was included on both side surfaces of the protection circuit module so that the bare cell was coupled to the protection circuit module. The conventional lithium secondary battery includes two lead plates extending in a different direction about the protection circuit module, and a separate outer cover that covers the lead plates so that a manufacturing process of the battery pack is finished. Accordingly, manufacturing cost of a whole battery is increased by each of these features, and the number of manufacturing steps is also concomitantly increased.

The outer cover was respectively arranged in both right and left directions of the battery. Therefore, a degree of freedom of a design according to the miniaturization of the battery was limited because width of the battery became longer.

SUMMARY OF THE INVENTION

It is therefore an object of the present invention to provide an improved secondary battery and an improved process for manufacturing secondary batteries.

It is another object to provide a secondary battery that can simplify the manufacturing process during an assembly of a bare cell and a protection circuit module, and that concomitantly reduces manufacturing costs.

It is still another object to provide a secondary battery that can simplify a manufacturing process, and reduce manufacturing costs by restricting installation of a connecting member of a protection circuit module electrically coupled to a bare cell in one direction of the bare cell.

According to another object of the present invention, there is to provide a secondary battery that can increase a degree of freedom of a design according to the miniaturization of the battery by shortening the overall width of the battery as measured in its longitudinal direction.

Additional advantages, objects and features of the invention will be set forth in part in the description which follows and in part will become apparent to those having ordinary skill in the art upon examination of the following or may be learned from practice of the invention.

According to one aspect of the present invention, there is provided a secondary battery, which may be constructed with a bare cell; a protection circuit module installed on one edge side surface of the bare cell; first and second electrode terminals included in the bare cell; first and second lead plates configured to electrically couple the protection circuit module to the first and second electrode terminals respectively, wherein the first and second lead plates are installed on the same single side edge surface of the bare cell.

The protection circuit module may be installed on one long side edge surface of the bare cell, and the first electrode terminal may be formed on one short side edge surface neighboring to the one long side edge of the bare cell, so that the first and second lead plates are connected to the first and second electrode terminals on one short side edge.

The first electrode terminal may be formed on the short side edge surface so as to protrude toward the outside, and the second electrode terminal may be formed on the short side edge surface of the bare cell. The first and second lead plates may be installed to be spaced apart from each other, and an outer circumferential surface of the first lead plate may be coated with an insulator.

The outer cover may be attached on the short side edge surface where the first and second lead plates are installed between the short edges of the bare cell.

The protection circuit module may be installed on one short side edge surface of the bare cell, and the first electrode terminal may be formed on one short side edge surface of the bare cell where the protection circuit module is installed.

The first electrode terminal may be formed on the short side edge surface of the bare cell so as to protrude toward the outside, and the second electrode terminal is formed on the short side edge surface of the bare cell. The first and the second lead plates are installed on one short side edge of the bare cell to be spaced apart from each other, and the outer circumferential surface of the first lead plate is coated with the insulator.

The protection circuit module may be securely attached on the short side edge surface of the bare cell by an injection molded resin case.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
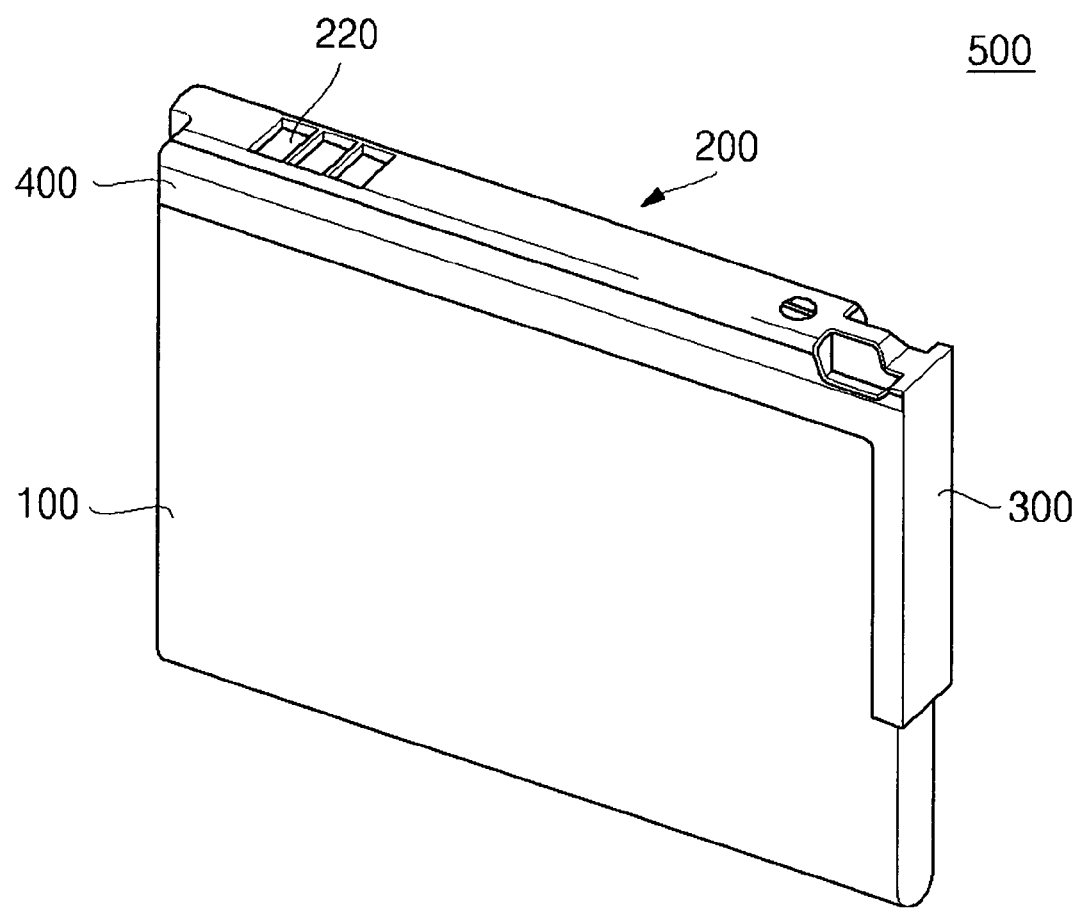
FIG. 1 is a perspective view illustrating a secondary battery constructed as one exemplary embodiment of the present invention.

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Figure 2:
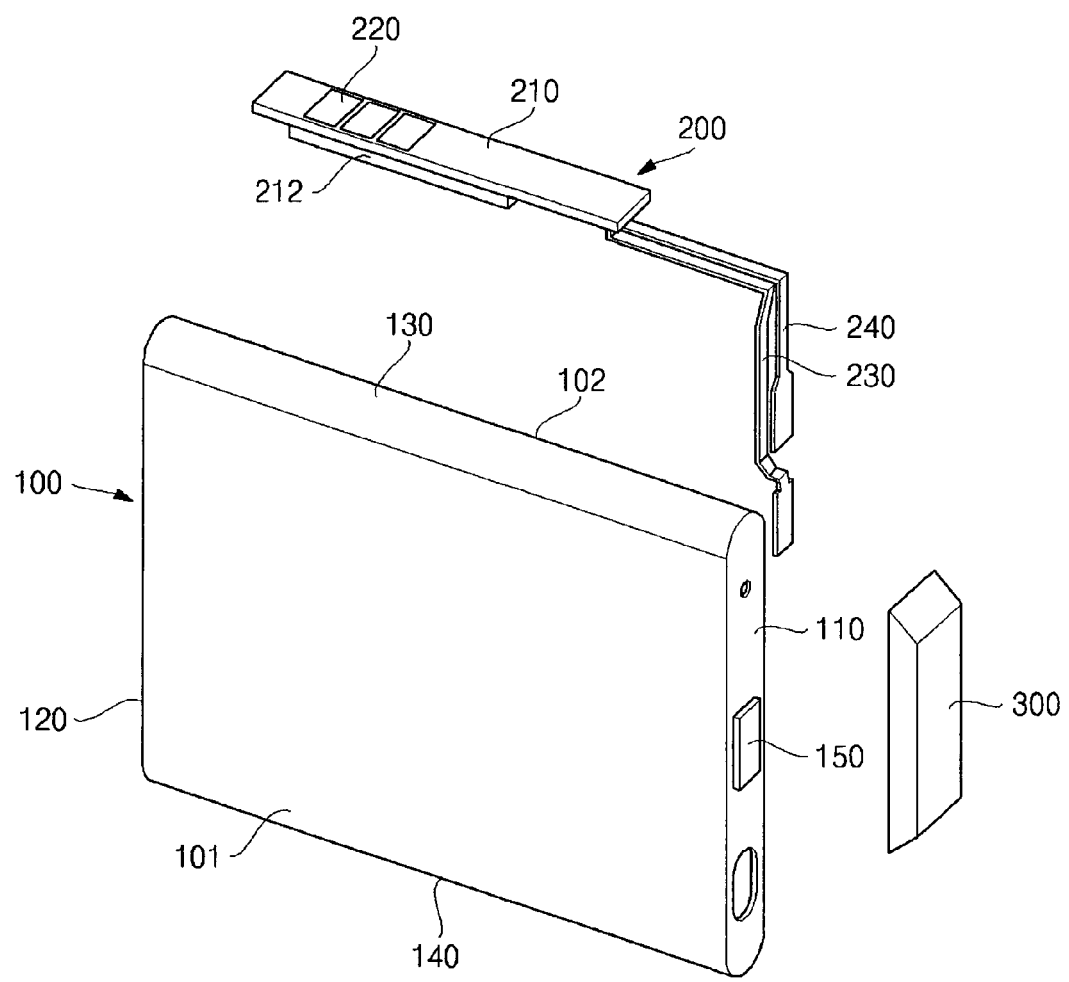
FIG. 2 is a perspective view illustrating a state that a protection circuit module and an outer cover are separated from each other in FIG. 1.
Figure 3:
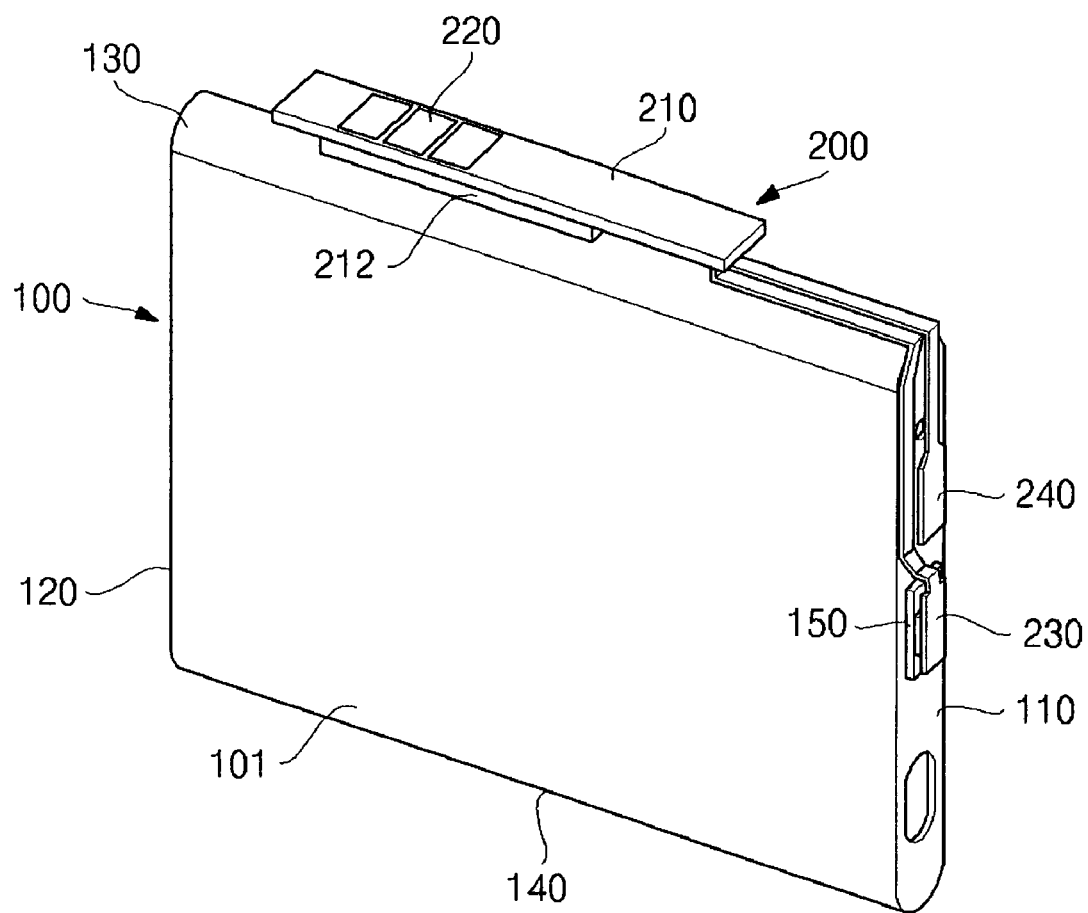
FIG. 3 is an exploded perspective view illustrating a combined state of the protection circuit module and the outer cover shown by FIG. 2.

Turning now to the drawings, and to FIGS. 1 through 3 collectively. FIG. 1 is a perspective view illustrating a secondary battery constructed as one exemplary embodiment of the present invention; FIG. 2 is a perspective view illustrating a state that a protection circuit module and an outer cover are separated from each other in FIG. 1; FIG. 3 is a perspective view illustrating a combined and assembled state of FIG. 2.

A lithium secondary battery 500 may be constructed with a bare cell 100 formed in a rectangular shape, a protection circuit module 200 electrically coupled to bare cell 100, an outer cover 300 covering both short side edges of the bare cell 100, and a resin molded part 400 molded between and joining an upper region at one long side edge of bare cell 100 including a part of outer cover 300 and protection circuit module 200.

Bare cell 100 has a rectangular parallelepiped shape that has both short side edge surfaces 110 and 120 corresponding to the relatively short side surfaces with respect to front and rear surfaces 101 and 102, and both long side edge surfaces 130 and 140 corresponding to the relatively long side surfaces.

Protection circuit module 200 is arranged on one long side edge surface 130, which forms a protection circuit substrate 210 and an outer terminal 220 installed on the protection circuit substrate 210.

Protection circuit substrate 210 may be constructed with a circuit that regulates changing of the battery in order to make the battery's charged state uniformed by controlling charge or discharge of the battery, and with a protection circuit preventing over-charge or over-discharge. Circuit element 212 is included in protection circuit substrate 210 to complete the one or more, stages forming the protection circuits.

Protection circuit substrate 210 includes a first lead plate 230 coupling protection circuit module 200 to an electrode terminal 150 formed on the short side edge surface of bare cell 100 so as to be protruded, and a second lead plate 240 coupling protection circuit module 200 to an opposite polarity to electrode terminal 150. In this embodiment, first and second lead plates 230 and 240 are installed on the same short side edge surface 110 of bare cell 100.

In both short side edge surfaces 110 and 120 neighboring long side edge surface 130 where protection circuit module 200 is installed, first lead plate 230 and second lead plate 240 are installed on short side edge surface 110 where electrode terminal 150 is formed so as to protrude toward the outside and away from surface 110. In first and second lead plates 230 and 240 installed on short side edge surface 110 of bare cell 100, first lead plate 230 is connected to electrode terminal 150, and second lead plate 240 is connected to short side edge surface 110 of bare cell 100 in a state of being surface-contacted. Second lead plate 240 electrically connects an opposite polarity to electrode terminal 150, because an outer circumferential surface of bare cell 100 including short side edge surface 110 of bare cell 100 has a polarity opposite to electrode terminal.

As first second lead plates 230 and 240 are installed so as to be spaced apart from each other by a predetermined distance, an electrical short which could be created due to a contact formed between the lead plates can be prevented.

Except for a region where first lead plate 230 is connected to electrode terminal 150, and a region where second lead plate 240 is coupled to bare cell 100, the other regions are coated with an electrical insulator so as to prevent the occurrence of an electrical short circuit, even when the lead plates are in contact with each other.

When second lead plate 240 is connected to short side edge surface 110 of bare cell 100, at least first lead plate 230 is coated with a layer of the electrical insulator so as to be insulated from short side edge surface 110 of bare cell 100. When first lead plate 230 is not insulated, it can be connected to electrode terminal 150 so as to be spaced apart from short side edge surface 110 of bare cell 100 without forming an electrical contact with short side edge surface 110 of bare cell 100.

First and second lead plates 230 and 240 are respectively electrically connected to short side edge surface 110 where electrode terminal 150 is installed, to short side edge surface 110 neighboring protection circuit module 200 installed on long side edge surface 130 of bare cell 100. Thus, a separate outer cover need not be installed on short side edge surface 120 opposite to short side edge surface 110.

Figure 4:
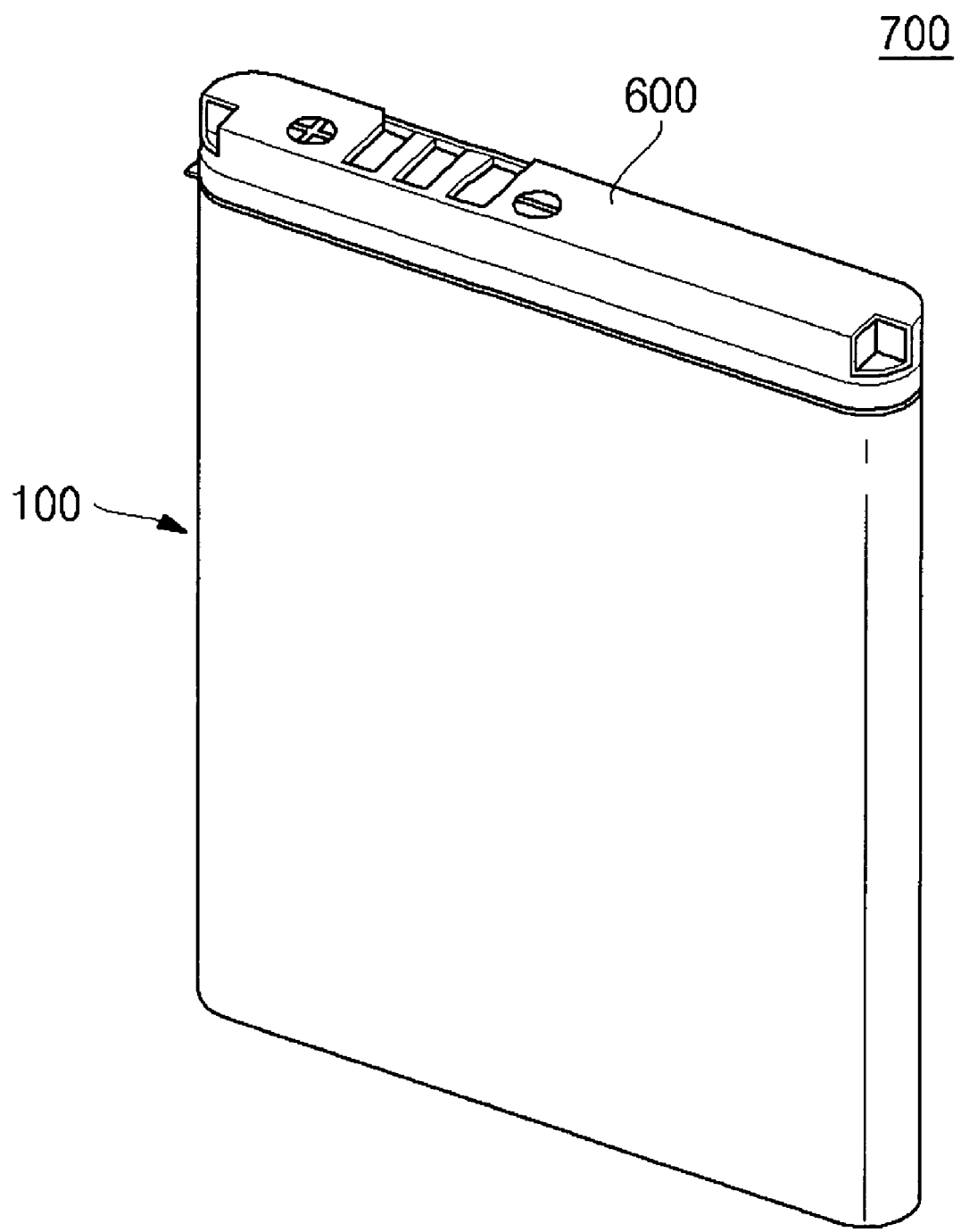
FIG. 4 is a perspective view illustrating a secondary battery according to another exemplary embodiment of the present invention.
Figure 5:
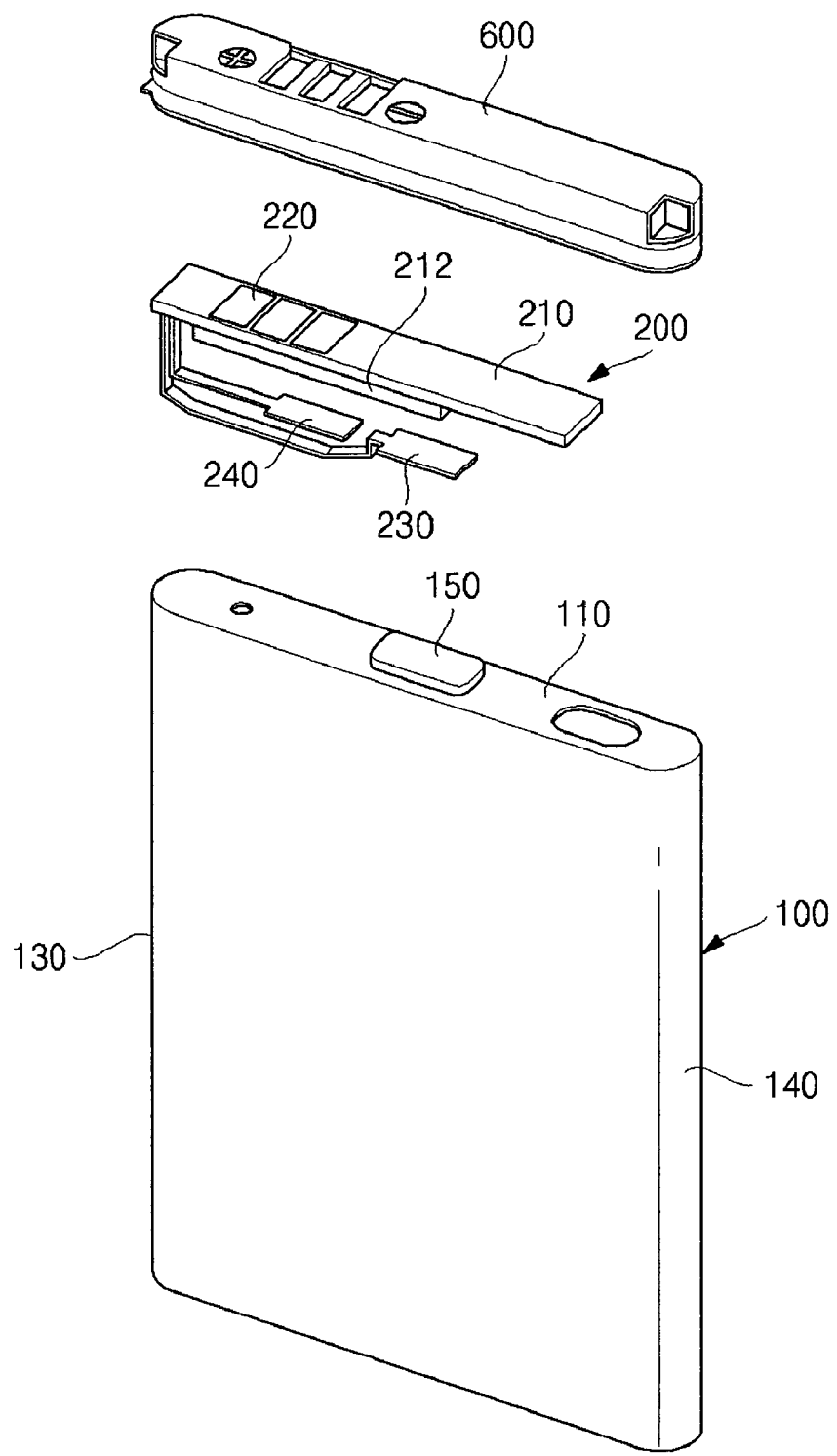
FIG. 5 is a view illustrating a combined state of a resin molded case in FIG. 4.

FIGS. 4 and 5 are perspective views illustrating separated and combined states of a secondary battery case constructed as another exemplary embodiment of the principles of the present invention.

Referring to FIGS. 4 and 5, protection circuit module 200 is installed on short side edge surface 110 of bare cell 100 in secondary battery 700 in the construction of another exemplary embodiment of the present invention. In other words, when protection circuit module 200 of a horizontal type may be installed in one exemplary embodiment of the present invention, protection circuit module 200 of a vertical type is installed in another exemplary embodiment of the present invention.

First and second lead plates 230 and 240 are installed on short side edge surface 110 of bare cell 100 with protection circuit module 200 so as to electrically couple bare cell 100 to protection circuit module 200 in another exemplary embodiment of the present invention.

As a result, first lead plate 230 is connected to electrode terminal 150 on short side edge surface 110 where protection circuit module 200 is installed, and second lead plate 240 is connected to short side edge surface of bare cell 100 in a surface-contact state.

First and second lead plates 230 and 240 are installed so as to be spaced apart from each other by a predetermined distance. Thus, an electrical short circuit due to a contact between the lead plates can be prevented.

When lead plates 230 and 240 are in electrical contact with each other, with the outer circumferential surface of the other regions of lead plates 230, 240 except for a connecting region that lies between first lead plate 230 and second lead plate 240 being coated with an insulator so as to prevent the occurrence of an electrical short circuit.

The outer circumferential surface of first lead plate 230 should be formed to be electrically insulated. If first lead plate 230 is not electrically insulated, lead plate 230 should be connected to electrode 150 without being in electrical contact with short side edge surface 110 of bare cell 100. Accordingly, it is not necessary that a separate washer of an insulating material should be installed on short side edge surface 110 of bare cell 100.

Protection circuit module 200 can be molded and attached to bare cell 100 by hot melt resin, but protection circuit module 200 is securely attached and is fixed by a previously molded resin case 600 in another exemplary embodiment of the present invention. In this particular embodiment, although not shown in the drawings, protection circuit module 200 is pre-assembled to a locked state so as to be integral with molded resin case 600, and then assembled on one side end of bare cell 100. After first and second lead plates 230 and 240 which extend outwardly from protection circuit module 200 are resistance-welded on electrode terminal 150 and short side edge surface 110 of bare cell 100, molded resin case 600 is assembled by a technique of covering one end of the upper part of short side edge surface 110 of bare cell 100, as shown in FIG. 5.

First and second lead plates 230 and 240 are installed together on short side edge surface 110 of bare cell 100 in another exemplary embodiment of the present invention, so that first and second lead plates 230 and 240 are covered by molded resin case 600 when combining protection circuit module 200 with bare cell 100, thereby allowing the outer cover to be safely eliminated.

As described above, the secondary battery according to the present invention produces the following beneficial results and advantageous results.

The connecting member of the protection circuit module electrically coupled to the bare cell may be conveniently installed on the same surface in one direction of the bare cell, thereby allowing the manufacturing process of the secondary battery to be simplified and the manufacturing cost of the secondary battery to be reduced.

The length of the battery is reduced in the longitudinal direction, thereby allowing a substantial increase in the degree of freedom for the design of the battery, and thus allowing further miniaturization of the battery.

It should be understood by those of ordinary skill in the art that various replacements, modifications and changes in the form and details may be made therein without departing from the is spirit and scope of the present invention as defined by the following claims. Therefore, it is to be appreciated that the above described embodiments are for purposes of illustration only and are not to be construed as limitations of the invention.

What is claimed is:

1. A secondary battery, comprising:
a bare cell including a first electrode terminal, and an outer peripheral surface acting as a second electrode terminal having a polarity opposite to the first electrode terminal and comprising a plurality of major surfaces separated by a plurality of minor surfaces;
a protection circuit module installed on one of the plurality of minor surfaces of the bare cell;
first and second lead plates both installed together on a same minor surface of the bare cell, the first and second lead plates respectively configured to electrically couple the protection circuit module to the first and second electrode terminals, the first and second lead plates both extending in a side-by-side relation in a same longitudinal direction of the same minor surface between the protection circuit module and the same minor surface of the bare cell, and the first and second lead plates being spaced apart from each other across the same minor surface; and
a discrete outer cover attached exclusively on the minor surface of the bare cell where the first and second lead plates are installed, so as to cover the first and second lead plates, the outer cover exposing at least two contiguous minor surfaces of the bare cell.

2. The secondary battery of claim 1, wherein the protection circuit module is installed on one longer minor surface of the bare cell, and the first electrode terminal is formed on one shorter minor surface neighboring to the one longer minor surface corresponding to the protection circuit module, so that the first and second lead plates are respectively connected to the first and second electrode terminals on the one shorter minor surface.

3. The secondary battery of claim 2, wherein the first electrode terminal is formed on the shorter minor surface so as to protrude toward an exterior of the bare cell and away from the shorter minor surface.

4. The secondary battery of claim 2, wherein an outer circumferential surface of the first lead plate is coated with a layer of an electrical insulator.

5. The secondary battery of claim 1, wherein the protection circuit module is installed on one shorter minor surface of the bare cell, and the first electrode terminal is formed on the one shorter minor surface of the bare cell where the protection circuit module is installed.

6. The secondary battery of claim 5, wherein the first electrode terminal is formed on the shorter minor surface to protrude to an exterior of the bare cell.

7. The secondary battery of claim 5, wherein the first and second lead plates are installed on one shorter minor surface of the bare cell.

8. The secondary battery of claim 5, wherein an outer circumferential surface of the first lead plate is coated with an electrical insulator.

9. The secondary battery of claim 5, wherein the protection circuit module is fixed on the shorter minor surface of the bare cell by a molded resin case.

10. A secondary battery, comprising:
a bare cell including a first electrode terminal protruding toward an exterior of the bare cell, and an outer peripheral surface acting as a second electrode terminal having a polarity opposite to the first electrode terminal and comprising a plurality of major surfaces separated by a plurality of minor surfaces;
a protection circuit module installed on one of a plurality of minor surfaces of the bare cell;
a resin molded part arranged between the protection circuit module and bare cell firmly connecting the protection circuit module and the bare cell together;
first and second lead plates both installed together on a same minor surface of the bare cell and configured to electrically couple the protection circuit module between the first and second electrode terminals, the first and second lead plates both extending in a side-by-side relation in a same longitudinal direction of the same minor surface between the protection circuit module and the same minor surface of the bare cell, and the first and second lead plates being spaced apart from each other across the same minor surface;
a discrete outer cover attached exclusively on the minor surface of the bare cell where the first and second lead plates are installed, so as to cover the first and second lead plates, the outer cover exposing at least two contiguous minor surfaces of the bare cell.

11. The secondary battery of claim 10, wherein the protection circuit module is installed along a longer one of minor surfaces of the bare cell, and the first electrode terminal is formed on a shorter one of minor surfaces neighboring to the longer one of minor surfaces corresponding to the protection circuit module, so that the first and second lead plates are respectively connected to the first and second electrode terminals on the one short minor surface.

12. The secondary battery of claim 10, wherein the first electrode terminal is formed on a shorter one of minor surfaces so as to protrude toward an exterior of the bare cell and away from the shorter one of minor surfaces, and the second electrode terminal is formed on the shorter one of minor surfaces.

13. The secondary battery of claim 10, wherein the protection circuit module is installed along a shorter one of the minor surfaces, and the first electrode terminal is formed on the shorter one of the minor surfaces where the protection circuit module is installed.

14. The secondary battery of claim 10, wherein the first and second lead plates are installed on a same minor surface where the first terminal is formed.

15. The secondary battery of claim 10, wherein the protection circuit module is installed along a longer one of minor surfaces of the bare cell, and the first and second lead plates are both installed on a shorter one of minor surfaces neighboring the longer one of minor surfaces.

* * * * *